UNITED STATES PATENT OFFICE.

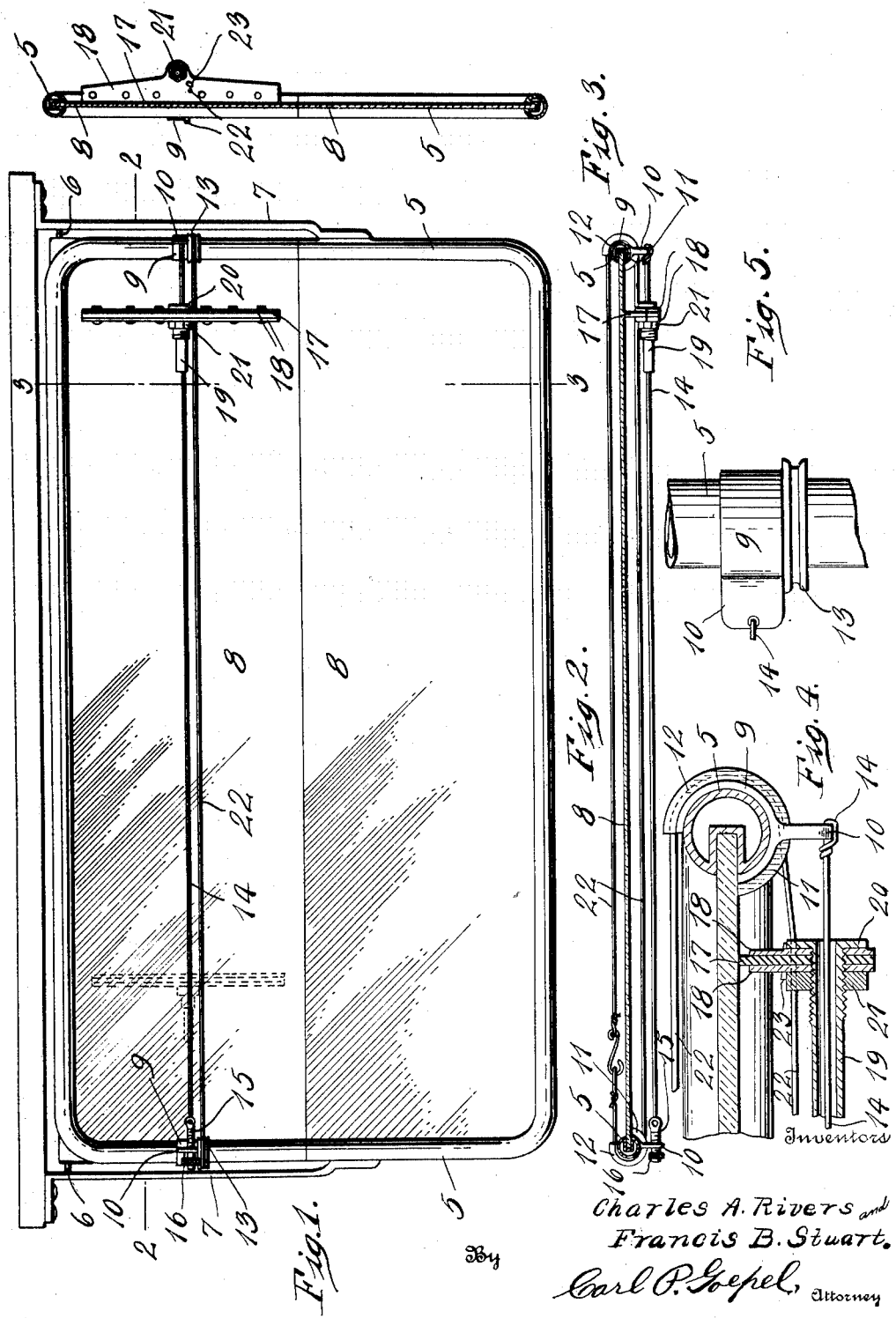

CHARLES A. RIVERS AND FRANCIS B. STUART, OF EL PASO, TEXAS.

CLEANING DEVICE.

1,373,096.   Specification of Letters Patent.   Patented Mar. 29, 1921.

Application filed March 4, 1919. Serial No. 280,561.

*To all whom it may concern:*

Be it known that we, CHARLES A. RIVERS and FRANCIS B. STUART, both citizens of the United States, and residents of El Paso, in the county of El Paso and State of Texas, have invented certain new and useful Improvements in Cleaning Devices, of which the following is a specification.

This invention relates to cleaning devices, and more particularly to a cleaner for wind shields, car windows, automobile headlights, etc.

In rainy or snowy weather, the face of the wind shield glass becomes covered with snow or rain and rendered more or less opaque so as to obscure the vision of the driver. This frequently causes serious accidents, sometimes resulting in the demolition of the vehicle and loss of life.

It is the primary object of the present invention to provide a very simple and inexpensive cleaning attachment which can be easily and quickly applied to the wind shields of different makes of vehicles and readily operated from the driver's seat to remove snow, mist, or dust from the front surface of the wind shield glass.

It is also an important object of the invention to provide such a cleaning device which may be applied to the wind shield without marring the frame thereof or necessitating structural changes or alterations of any character.

The invention contemplates the provision of a very novel means for mounting the cleaning device upon the wind shield frame, embodying supporting brackets for clamping engagement upon opposite sides of the frame, and tensioning means connecting the brackets and securely holding the same in their applied positions, which means also constitutes a guide for the cleaning member.

It is likewise one of the detail objects of our invention to provide improved means for variably adjusting the pressure of the cleaning member upon the face of the glass to compensate for wear thereof and assure proper cleaning action at all times.

Having the aforementioned objects in view, the present invention comprehends certain novel and improved combinations of mechanical elements, and the structural characteristics thereof, as will be more fully developed in the following description and subsequently incorporated in the subjoined claims.

In the accompanying drawings:

Figure 1 is a front elevation of an automobile wind shield of a conventional and well known construction illustrating one embodiment of our invention as applied thereto;

Fig. 2 is a horizontal sectional view taken on the line 2—2 of Fig. 1;

Fig. 3 is a vertical section taken on the line 3—3 of Fig. 1;

Fig. 4 is an enlarged detail horizontal section of one side of the wind shield frame illustrating the manner of mounting the movable cleaning member;

Fig. 5 is a fragmentary side elevation of the wind shield.

Referring in detail to the drawings, wherein like reference characters designate corresponding parts throughout the several views. 5 designates the marginal frame of a wind shield, the upper section of which is pivotally mounted as shown at 6 between the vertical bracket members 7 for swinging movement in the usual manner. 8 designates the glass which is affixed in the wind shield frame.

The present invention is adapted to be applied to the frame of the upper wind shield section and in its preferred embodiment includes the bracket members 9. Each of these bracket members is formed with a forwardly projecting arm 10 and at one end of this arm a laterally curved extension 11 is provided, the free end of which is adapted to abut against the front face of the wind shield glass 8 at a point closely adjacent to the marginal frame thereof. A second curved extension 12 projects in a relatively opposite direction to the extension 11 from the arm 10 and is of appreciably greater length than the extension 11. These curved extensions closely embrace and engage upon the frame of the wind shield, the extension 12 engaging around the outer side of the frame and upon the rear side thereof. This extension 12 is formed in its outer face with a groove or channel indicated at 13, the purpose of which will be presently disclosed.

To the end of the arm 10 of one bracket member, a resilient metal wire 14 is securely attached. The other end of this wire is connected to one end of a threaded bolt 15 which is loosely engaged through an aperture in the arm 10 of the other bracket member. A nut 16 is threaded upon the extremity of this bolt and bears against the outer side of the bracket arm. It will therefore be readily understood that by simply adjusting the nut 16, the resilient wire 14 may be tensioned as desired and the bracket members pulled inwardly around the side portions of the frame so as to hold the ends of the extension 11 in tight abutting engagement against the face of the glass. These bracket members are preferably formed of spring brass and snugly fit upon the frame. They are, however, capable of a turning movement when sufficient force is applied, and it will be apparent that without the tensioning and holding means described or a positive fixture of the brackets to the frame, they would shift from their applied positions. By the employment of the connecting and tensioning wire between the brackets, we have obviated the necessity of using screws or other analogous fastening elements which would mar the wind shield frame, and by such means we also have been able to apply the invention to wind shield frames of various makes and widths.

The cleaning member which extends for substantially the entire width of the glass 8 in the upper section of the wind shield, includes a heavy strip of rubber or other similar material indicated at 17, which is secured between the metal plates 18. These metal plates and the rubber strip are provided with registering openings through which a guide sleeve or tube 19 is loosely engaged. This sleeve is formed with an angular collar or flange 20 at one end against which the cleaning member is engaged, and adjacent to this flange the sleeve is exteriorly threaded to receive the clamping member 21 having frictional engagement against the opposite side of the cleaning member. The sleeve 19 is loosely engaged upon the wire 14 which thus serves as the guiding and holding means for the cleaning member.

The cleaning member is operated and moved across the front face of the wind shield glass through the medium of a cable or other flexible element 22 which extends around the supporting brackets engaged with and secured upon the wind shield frame in the manner above stated, and is disposed within the guide grooves 13 thereof. The flanges at the opposite sides of said grooves effectually prevent the accidental displacement of the operating element from the bracket members. The flexible member 22 at the front side of the wind shield extends through an opening in the cleaning member and is adapted to be tightly secured within said opening by means of a suitable wedge, pin or key shown at 23. The extremities of the operating element 22 are attached each to a link or hook 24 and these links are adapted to be detachably connected with each other at the rear side of the wind shield. Thus, it will be understood that the flexible operating member 22 can be readily lengthened or shortened in accordance with the width of the wind shield to which the device may be applied.

In the practical operation of the above described form of our invention, when the surface of the wind shield glass 8 becomes so obscured with mist, snow or dust as to interfere with the clear vision of the driver of the machine, it is only necessary for the driver to reach forward and grasp the flexible operating element 22 and move the same toward one side of the wind shield. The operating element will thus be shifted around the supporting brackets and the cleaning member will be moved from one side of the wind shield to the other with its rear vertical edge bearing tightly against the surface of the wind shield glass. In such movement, it will be apparent that all snow, rain or mist which may have collected upon the surface of the glass will be cleanly removed therefrom. The operator in the vehicle may thus at all times have a clear and unobstructed view of the roadway in front of the machine so that collisions with other vehicles may be avoided and the possibility of serious injury to the machine and the occupants thereof, obviated.

It will be appreciated from the foregoing description taken in connection with the accompanying drawings, that we have devised a very simple and inexpensive attachment of such construction that it is adaptable not only to automobile wind shields but likewise to the windows of steam or street railway cars, cabs and other vehicles. The mounting for the movable cleaning member may be very easily adjusted and securely applied in its operative position to windows of various widths and without necessitating structural alterations of a material character therein. As the device does not form a permanent part of the equipment of the machine, it may also be readily transferred from one machine to another. The several detail parts of the device are likewise of simple and durable construction and the manufacturing cost of the invention as a whole will be relatively small.

In the preceding description and the accompanying drawings we have disclosed one practical embodiment of the invention, which, however, may likewise be exemplified in numerous alternative constructions. Accordingly the invention as herein claimed is to be considered as inclusive of all legitimate equivalents for the various elements employed as well as other contemplated arrangements thereof, which may satisfactorily accomplish the desired results.

We claim:

1. A cleaning device of the character described including a pair of bracket members, each member having means for engagement with a windshield to limit rotation of the member when urged to turn in one direction, and means for removably securing the bracket members to the windshield including a tensionable element connected to the bracket members and adapted for tensioning said bracket members into binding position on the windshield.

2. A cleaning device of the character described including a pair of bracket members arranged to engage the sides of a windshield frame and outstand from one side thereof, each of said bracket members having means for engagement with the windshield to limit rotation of the bracket member when urged to turn in one direction, and means for removably securing said bracket members to the frame including an adjustable element extending between and connecting the outstanding portions of the bracket members.

3. A cleaning device of the character described including a pair of bracket members, each of said bracket members having stop means for engagement with a windshield to limit rotation of the bracket member when urged to turn in one direction, each of said bracket members also having an arm outstanding therefrom adjacent to said stop means, and a tensionable element extending between and connecting said outstanding arms of the bracket members for binding the latter on the windshield.

4. In a cleaning device of the character described, supporting brackets adapted to be engaged upon opposite sides of a wind shield frame, one edge of each bracket being adapted to bear against the glass; means connecting said brackets and adapted for adjustment to engage and retain the brackets in their applied positions against the front side of the wind shield glass, said means including a guide and a cleaning member movable along said guide over the surface of the glass.

5. In a cleaning device of the character described, supporting brackets adapted to be engaged upon opposite sides of a wind shield frame, a single resilient wire connecting said brackets, means for tensioning said wire to retain the brackets in their applied positions with one edge of the brackets bearing against the wind shield glass, and a cleaning member movable across the wind shield glass and guided by said resilient wire.

6. A cleaning device of the character described including a pair of bracket members, each bracket member having means for engagement with a windshield to limit the rotation of the bracket member when urged to turn in one direction, a cleaner for the windshield, and securing means adjustably connecting and extending between the brackets and adapted to be adjusted for binding said brackets on the windshield, said securing means also engaging said cleaner for supporting the same against one side of said window pane.

7. A cleaning device of the character described including a pair of bracket members, each of said bracket members adapted to substantially embrace more than one-half of the side frame of a windshield and adapted at one end to engage a part of the windshield to limit the rotation of the bracket member when urged to turn in one direction, and tensionable means extending between and connecting the brackets for urging the same to turn in a direction to bind said stops on the windshield and adapted to bind the opposite end portions of said brackets on the side frame of the windshield for rigidly securing the brackets thereto.

8. In a cleaning device of the character described, supporting brackets adapted to be engaged upon opposite sides of a wind shield frame, a single resilient wire connecting said brackets, means for tensioning said wire to retain the brackets in their applied positions and in engagement with the wind shield glass, a sleeve movable along the resilient wire, a cleaning member fixed upon one end of said sleeve and extending above and below the same, and a flexible operating member mounted upon and supported by said brackets and connected to the cleaning member.

In testimony that we claim the foregoing as our invention, we have signed our names hereunder.

CHARLES A. RIVERS.
FRANCIS B. STUART.